United States Patent [19]

Gerstenberger

[11] Patent Number: 5,220,441
[45] Date of Patent: Jun. 15, 1993

[54] MECHANISM FOR DETERMINING PARALLAX BETWEEN DIGITAL IMAGES

[75] Inventor: Jeffrey S. Gerstenberger, Rochester, N.Y.

[73] Assignee: Eastman Kodak Company, Rochester, N.Y.

[21] Appl. No.: 590,612

[22] Filed: Sep. 28, 1990

[51] Int. Cl.⁵ .............................................. H04N 1/04
[52] U.S. Cl. .................... 358/487; 358/448; 358/107; 356/2
[58] Field of Search .................. 358/448, 93, 107, 88, 358/487; 356/2, 12; 250/258

[56] References Cited

U.S. PATENT DOCUMENTS

| | | | |
|---|---|---|---|
| 2,964,643 | 12/1960 | Hobrough | 250/220 |
| 3,432,674 | 3/1969 | Hobrough | 250/220 |
| 3,597,083 | 7/1971 | Fraser | 356/2 |
| 3,617,625 | 11/1971 | Redpath | 250/558 |
| 3,678,190 | 7/1972 | Cook | 178/6.8 |
| 3,901,595 | 7/1975 | Helava et al. | 356/2 |
| 3,950,097 | 4/1976 | Gopfert | 356/2 |
| 4,450,579 | 5/1984 | Nakashima et al. | 382/8 |
| 4,873,572 | 10/1989 | Miyazaki et al. | 358/98 |
| 4,895,437 | 1/1990 | Tsujiuchi et al. | 358/125 |
| 4,905,081 | 2/1990 | Morton | 358/88 |
| 4,980,762 | 12/1990 | Heeger et al. | 358/93 |
| 5,073,819 | 12/1991 | Gates et al. | 358/101 |

OTHER PUBLICATIONS

The Gestalt Photomapping System (Kelly et al), "Photogrammetric Eng. & Remote Sensing", vol. 43, No. 11, Nov., 1977, pp. 1414–1417.
The Automatic Generation of Digital Terrain Models From Satellite Images by Stereo (Cooper et al) "Acta Astronautica", vol. 15, No. 3, 1987 pp. 171–180.
Digital Image Process of Remote Sensing Imagery (Manfred Ehlers), Actes due Symposium International de la Commission VII de la Societe Internationale de Photogrammetrie . . . , Toulouse, Sep. 1982, pp. 71–77.
Increase in Correlation Accuracy of Remote Sensing Imagery by Digital Filtering (Manfred Ehlers) "Photogrammetric Engineering and Remote Sensing", vol. 48, No. 3, Mar. 1982.
The Effects of Image Noise on Digital Correlation Probability (M. Ehlers), "Photogrammic Engineering and Remote Sensing", vol. 51, No. 3, Mar. 1985, pp. 357–365.
Digital Elevation Model Extraction from Stereo Satellite Images, (D. Kauffman et al) "Proceedings of the International Geoscience and Remote Sensing Symposium", 1987, pp. 349–352.
Format for the SPOT Image Corporation Computer Compatible Tapes—SPOT Image Corporation, Aug., 1986.
Elements of Photogrammetry (Paul Wolfe)—"McGraw Hill", New York 1974, pp. 155–160.
Stereocorrelation of Landsat TM Images, (Ehlers et al), "Photogrammetric Engineering and Remote Sensing", vol. 53, No. 9, Sep. 1987, pp. 1231–1237.

Primary Examiner—Edward L. Coles, Sr.
Assistant Examiner—Thomas L. Stoll
Attorney, Agent, or Firm—Mark Z. Dudley

[57] ABSTRACT

A mechanism for determining parallax between first and second digital images employs an iterative image pattern search and correlation process, which is able to rapidly determine the parallax for each pixel that is common to the images captured by a stereo image pair. By the initial use of a dispersed sub-array of reference point pixels distributed throughout a first image array, a similarly dispersed sub-array of tie points, to be used as starting points for subsequent, more densely populated search and correlation steps, can be rapidly obtained for the second image array. The derived parallax values may then be subjected to an interpolation function to sub-pixel accuracies. Once the parallax between the first and second image arrays has been derived, elevations can be computed using a conventional parallax-dependent mechanism.

57 Claims, 5 Drawing Sheets

IMAGE ARRAY 21

IMAGE ARRAY 22

MECHANISM FOR DETERMINING PARALLAX BETWEEN DIGITAL IMAGES

FIELD OF THE INVENTION

The present invention relates in general to stereo image processing and is particularly directed to an iterative search and correlation mechanism for determining the parallax between respective digital images of a contoured surface.

BACKGROUND OF THE INVENTION

Stereo images of a contoured surface (e.g. terrain) are often employed in elevation mapping and three dimensional visualization applications to derive elevation data from which a perspective view of the surface from an arbitrary vantage point can be recreated. In order to determine elevation information from a two dimensional image, the parallax between common locations of the stereo image pair is measured. As an example of how parallax may be used to determine the elevation of objects within a scene, consider the diagrammatical illustrations, in FIG. 1, of respective images 11 and 12 containing a pyramid 14, as viewed from respectively different look angles in the horizontal (or x) direction. The pyramid has four corners A, B, C and D that lie on generally flat surface 16 and an apex E that rises to some elevation datum above surface 16. The parallax of any point in the scene is the difference in the coordinates for that point for the two images, so that the parallax for each of common elevation points A, B, C and D is the same, here 40 for the coordinate values shown, while the parallax of apex point E is 50. This difference in parallax indicates that the elevation of point E is different from that of points A, B, C and D and, by applying this difference to a conventional parallax-based elevation function, the elevation of point E relative to surface 16 may be determined. Given the relative elevations of multiple points on a stereo image of a contoured surface, a model or perspective recreation of that surface may be obtained.

Conventional methodologies for determining parallax include those in which an operator looks through an optical system to locate elevation points, and the those which electronically scan a stereo image pair. In the former technique, an operator views the overlay of a moveable reticle on a stereo image pair through an optical viewfinder and manipulates the location of a reticle until, in the operator's best estimation, the reticle is coincident with the surface of the contour being viewed. This chosen position of the reticle is then identified as a surface elevation. Obviously, this technique suffers from a variety of shortcomings including human judgment, labor intensity, time consumption and limited data acquisition. Whatever data is obtained is then used to interpolate between points. As a consequence, only a very coarse approximation of the surface can be determined.

In a conventional electronics system, on the other hand, such as one employing a flying spot scanner to trace successive lines across the images, characteristics of the video return signal (typically delay or shift) are analyzed to determine parallax. Still, the resolution is limited by the granularity of the scan and the video signal analysis. Moreover, as in the operator-based system described previously, the number of data points is limited (typically less than half the number of pixels in the image) so that a significant amount of interpolation is required.

An additional conventional scheme for determining parallax subjects each of the images to an edge detection mechanism, which attempts to match edge segments of one image with those of the other. A primary shortcoming of this technique is the fact that the parallax can only be calculated for those portions of the image which belong to edges (typically on the order of only 5-10%), so that the remainder of the image points must be interpolated using these edge results.

SUMMARY OF THE INVENTION

In accordance with the present invention, the resolution and precision limitations of such conventional parallax determination techniques are obviated by a new and improved image analysis mechanism which, by means of image pattern correlation, determines the parallax for each pixel that is common to the images captured by a stereo image pair. In particular, the present invention is intended for use with a digitized image processing system wherein an image of a contoured surface of interest is captured as a stereo image in the form of first and second digitized images. These images are respectively representative of first and second views of the contoured surface as seen from first and second respectively different look angles. Each digitized image is comprised of a respective array of image pixels, so that the stereo image pair is in the form of first and second arrays of pixels of a prescribed spatial resolution (e.g. a 512×512 pixel image) and a predetermined encoding resolution (e.g. eight or sixteen bits per pixel, grey scale).

Pursuant to the image analysis process conducted in accordance with the present invention, a sub-array of reference point pixels distributed throughout the first image array is defined. Centered about each of these reference point pixels is a respective first image pattern window. The contents of the image pattern windows are correlated with the image contents of respective first correlation windows, which are centered about respective 'tentative' tie point pixels distributed throughout the second image array in the same manner as the sub-array of reference point pixels of the first image array. In order for the image contents of a first image pattern window to be valid, the contrast within the image pattern contained in each first image pattern window must be greater than a prescribed contrast value.

The first correlation windows are successively translated or shifted to different placements within the first search windows and respective correlation values are derived. On the basis of these correlations, those pixels of the second image array which represent the centers of the first correlation windows that produced the highest correlation values are identified as 'tie point' pixels. The parallax between respective ones of the tentative tie point pixels and the correlation-identified tie point pixels of the second array is then measured. Using these 'tie point'-based parallax measurements as starting points, the parallax between the remaining pixels of the two image arrays is then determined by iteratively conducting search and correlate operations similar to those used for locating 'tie point' pixels.

More specifically, in accordance with the iterative search and correlate process, respective boundary windows are defined about the reference point pixels of the first image sub-array. Each boundary window contains a respective reference point pixel and a plurality of neighboring pixels and borders adjacent boundary windows of the first image array. The average value of the measured parallax for groups of identified tie points and their associated tentative tie points is measured. Those identified pixels whose parallax differs from the average value of the measured parallax by more than the standard deviation are considered invalid and are discarded.

Using an identified reference point pixel within a boundary window of the first image array, for which a valid tie point pixel was identified in the second image array, as a starting point pixel, the image contents of a second image pattern window, which contains a pixel adjacent to that starting point pixel and a plurality of neighboring pixels, are correlated with the image contents of a respective second correlation window of the second image array. The second correlation window is similarly sized and positioned among pixels of the second image array, so that it contains a pixel displaced with respect to its identified tie point pixel in the same manner that the adjacent pixel in the boundary window of the first image array is displaced with respect to the starting point pixel. The second correlation window is then successively displaced within a second search window of the second array which is centered about the displaced pixel. That position of the second correlation window within the second search window which yields the highest correlation value with the image pattern contained in the second image pattern window is used to identify which pixel of the second array represents a location on the contoured surface corresponding to the adjacent pixel within the boundary window of the first image array, so that the parallax between that adjacent pixel of the first image array and the thus identified pixel of the second search window can be measured. This procedure is then iteratively repeated for the remaining pixels in each boundary window, always using a high confidence identified pixel of the second image array as the starting point for the next correlation search.

After completion of the above procedure, it can be expected that there will remain regions of pixels surrounding a tentative tie point for which no valid tie point was identified, pixels for which boundary window search and correlation results were insufficient to locate and determine parallax. For each of the reference point pixels of the first image array for which corresponding valid tie point pixels in the second image array were not identified, the parallax between pixels contained in the associated boundary window and corresponding pixels of the second image array is determined in accordance with the parallax that has been determined for pixels lying along the edge or borders of neighboring boundary windows that contain valid tie points.

Specifically, for a respective pixel along the edge of a boundary window of the first array for which no valid tie point was identified in the second array, a corresponding pixel of the second array is located in accordance with the geometric relationship between that respective pixel and an adjacent pixel of a neighboring boundary window the parallax for which has been determined. Then, for each respective pixel of the second array thus located, a third search window is defined so as to contain that pixel and a plurality of neighboring pixels. For a respective pixel belonging to the boundary window, a third image pattern window is defined to contain the respective pixel and a plurality of neighboring pixels. The size of the third image pattern window is less than the size of the third search window. Within the third search window a third correlation window, sized in correspondence with the third image pattern window of the first image array, is defined. Then, for respectively different locations of the third correlation window within the third search window, the contents of the third correlation window are correlated with the contents of the third image pattern window. That pixel among the image pixels of the third search window which is the center of the third correlation window producing the largest correlation value is identified as being associated with the respective pixel of the boundary window, and the parallax of that identified pixel is then measured. This process is repeated for each pixel along the edge of the boundary window based upon data for pixels along the edges of bordering boundary windows. The next interior lines of the boundary window are processed in a similar manner using the edge values, and so on, wording into the center of the boundary window, until all pixels of the boundary window have been processed.

After this step, the parallax for any remaining pixels is determined by scanning the array (e.g. from left-to-right and from top-to-bottom) to locate a corresponding pixel of the second array in accordance with the geometric relationship between that remaining pixel and an adjacent pixel, the parallax for which and a corresponding pixel of the second image array has been determined. For each respective corresponding pixel of the second image array thus located, a fourth search window, the size of which is larger than earlier used search windows, is defined to contain the corresponding pixel and a plurality of neighboring pixels. Centered about a respective remaining pixel, a fourth image pattern window is defined such that the size of the fourth image pattern window is increased relative to those previously used. Within the fourth search window a fourth correlation window sized in correspondence with the fourth image pattern window is defined. Then, for respectively different locations of the fourth correlation window within the fourth search window, the contents of the fourth correlation window are correlated with the contents of the fourth image pattern window, to identify about which pixel fourth correlation is centered for its largest correlation value. That identified pixel is used to determine parallax for the pixel of interest.

The images are then again scanned in a different direction (e.g. bottom-to-top and right-to-left), and once more in the first direction, each scan using correlation and search windows of progressively larger sizes. At the completion of a this iterative search and correlate procedure, the parallax for substantially all of the pixels (e.g. on the order of 97% of the pixels) of that portion of the first and second arrays common to each image will have been determined.

As a further enhancement of the above process, the derived parallax values may be subjected to an interpolation function to sub-pixel accuracies. The correlation window is translated in integral steps of one pixel per step within the search window, and parallax is determined to sub-pixel accuracies. This is accomplished by using a Lagrange polynomial interpolation on the values returned by the correlation function to determine where the local maxima is located. This interpolation function calculates the value of the correlation function at the integral step with the maximum value (the stored parallax result) and at two points on either side of the maximum. These (three) values are then used in a second order Lagrange polynomial to interpolate the position (between integral pixel steps) at which the local maxima occurs. This fractional parallax value is then stored as the final result of the correlation process. Once the parallax between the first and second image arrays has been derived, elevations can be computed using a conventional parallax-dependent mechanism.

DETAILED DESCRIPTION

Figure 1:
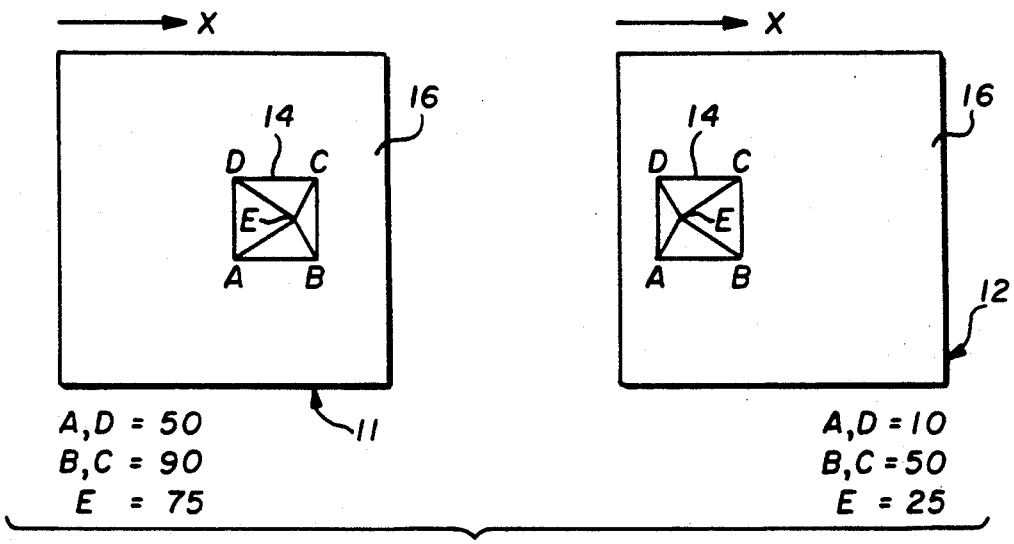
FIG. 1 diagrammatically illustrates respective images of a pyramid as viewed from respectively different look angles.

Before describing in detail the parallax determination mechanism in accordance with the present invention, it should be observed that the present invention resides primarily in a novel structural combination of conventional digital imagery processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 2:
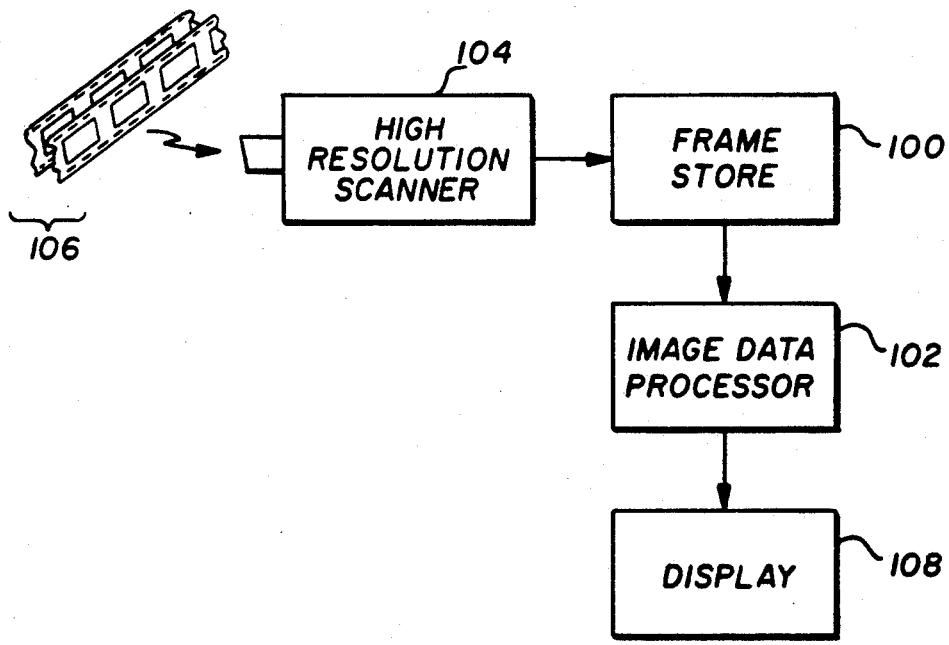
FIG. 2 diagrammatically illustrates an imagery data processing system in which the processing mechanism of the present invention may be incorporated.
Figure 3:
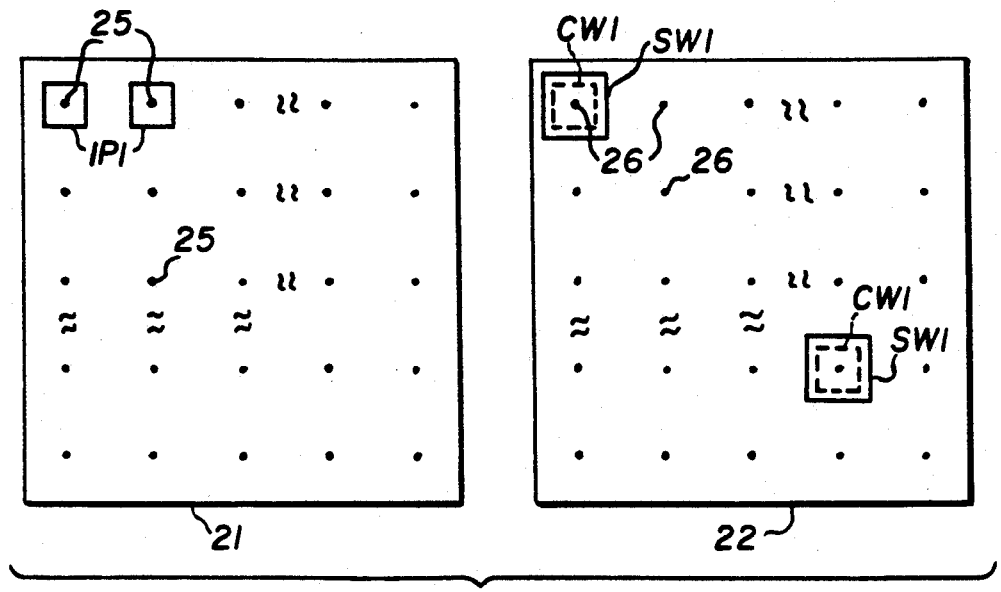
FIG. 3 diagrammatically illustrates a pair of digitized images of a stereo image pair, the contents of which are to be subjected to the parallax processing mechanism of the present invention.

Referring now to FIG. 2, an imagery data processing system in which the processing mechanism of the present invention may be incorporated is diagrammatically shown as comprising an frame store 100 that contains a plurality of digitally encoded stereo image pairs, portions of or the entireties of which may be selectively accessed by an attendant image data processor 102. The digitized images in frame store 100 may have been obtained from a color image transducer device, such as a high resolution digital scanner 104 that generates image characteristic-representative digital signals, representative of the image contents of a stereo image pair captured on first and second photographic recording media 106 onto which a contoured surface of interest has been imaged by a stereo image capture system (e.g. an airborne or spaceborne imaging platform) not shown. On the other hand, the digitized image data may have been generated directly from digital camera units for storage in an associated digital data base for subsequent processing by processor 102. It is to be noted that the present invention is not limited to the analysis of stereo image data from a particular source. The output of processor 102 may be coupled to an attendant display 108 for providing a presentation of perspective image that has been generated using elevation data derived in accordance with the parallax determined by the iterative search and correlate process of the present invention to be described in detail below. As pointed out briefly above, the present invention uses a search and correlate digitized image processing routine to determine the parallax for each pixel that is common to the images captured by a stereo image pair. FIG. 3 diagrammatically illustrates a pair of digitized images 21 and 22 of a stereo image pair, the contents of which are to be subjected to the parallax processing mechanism of the present invention. As a non-limitative example, each of images 21 and 22 may comprise an array of 512×512 pixels the grey scale values of which have been digitally encoded to an eight or sixteen bit resolution. The images themselves may be output directly by high resolution digital camera units, or they may be derived by digitally scanning first and second stereo images that have been captured by an airborne/spaceborne imaging system used for terrain mapping, for example. For purposes of the present description, any non-common portions of the images will be ignored.

Pursuant to the image analysis process of the present invention, computation complexity is substantially reduced by an iterative process which steps through a sequence of correlation searches, each of which is initially referenced to what has been determined to be valid data, so that the data processing time to locate further data points can be reduced substantially.

TIE POINT CORRELATION: STEP 1

The process begins by conducting a coarse parallax determination of the overall image by means of a sub-array of preestablished reference or 'starting points' distributed throughout the image. For this purpose, one of the images of the image pair, image array 21 for example, is subdivided into a sub-array of reference or 'starting' points 25 evenly distributed throughout the image array. For the example of an image containing a (512×512) array of pixels, image 21 may be subdivided into a sub-array of (32×32) starting points 25, having a spatial periodicity of 16 pixels, so as to provide ample room for a reasonably sized correlation window to be framed about each starting point without overlapping that of an adjacent starting point. The sub-array of starting points 25 is referenced to a coordinate system commonly employed for each image, so that for the second image 22, a like sub-array of tentative 'tie' points 26 may be evenly distributed among the pixels of that image. Namely, points 26 represent locations on the surface contour that are to be 'tied' to the starting points, for the purpose of establishing a base parallax reference upon which the remainder of the computations will be depend. Once the locations of these 'tie' points have been determined parallax measurements for the remaining pixels of the image are conducted in local neighborhoods associated with each tie point, using its parallax as a base parallax value for that neighborhood. Of course, due to parallax between the two images whatever pixels have been initially chosen as tentative 'tie point' pixels in image array 22 will be necessarily offset from the coordinate locations of starting point pixels 25 of image array 21.

Figure 4:
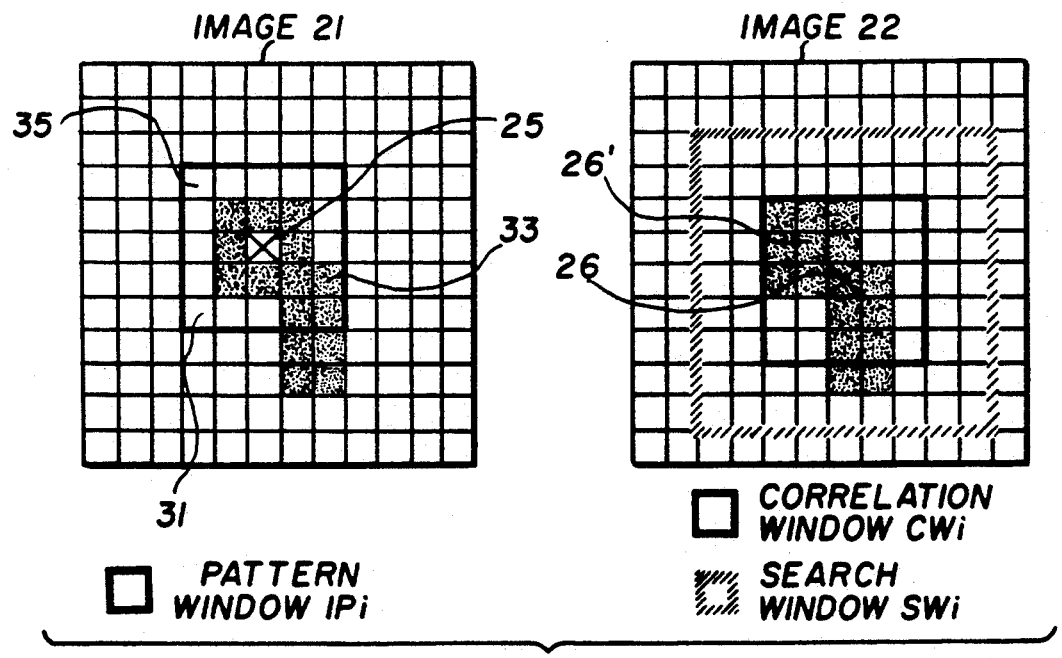
FIG. 4 diagrammatically illustrates an image pattern of a first image array of a stereo image pair and associated correlation and search windows of a second image array of the stereo image pair.

With the sub-array of starting points 25 defined within the first image array 21, a respective first image pattern window IP1 is formed about each respective starting point pixel 25, as diagrammatically illustrated in FIG. 4. As shown in FIG. 4, a respective first image pattern window IP1 contains (is centered about) a starting point pixel 25, and encompasses a plurality of neighboring pixels 31. In the illustrated example, image pattern window IP1 is a square (5×5) matrix of pixels, containing a pattern of relatively darker pixels 33 bordered by adjacent relatively lighter pixels 35. It should be observed, however, that the size of the image pattern matrix is not limited to this or any other particular size. In an actual prototype example, the image pattern window employed an (11×11) matrix; the (5×5) matrix shown here is for purposes of simplifying the drawing.

Referring again to FIG. 3, associated with each starting point-centered first image pattern window IP1 of first image 21 are a plurality of first search windows SW1 distributed among the second array 22, such that each first search window SW1 encompasses a respectively different plurality of pixels that contains a tentative 'tie' point pixel 26. Because the sub-array of tentative tie point pixels 26 is referenced to the same coordinate system employed for starting point pixels 25 in the first image array 21, tentative tie point pixels 26 are effectively evenly distributed among the pixels of the second image, such that, within image 22, a respective tentative tie point pixel 26 is located geometrically proximate to the location of a respective starting point pixel 25 within image 21.

As shown in FIG. 4, the size of a first search window SW1 is larger than the first correlation window CW1 and is centered about a tentative tie point pixel 26. While an actual prototype example employed a (35×15) matrix, the (9×9) matrix shown in FIG. 4 is for purposes of simplifying the drawing. Correlation window CW1 is the same size as first image pattern window IP1. To provide for correlation computational efficiency, the size differential between a search window and a correlation window is preferably such that the number of shifts or translation of a correlation window within the search window is limited to a reasonable number (e.g. twenty-five for the illustrated example, although the above-referenced prototype example employed 125 shifts). What is important is making sure that the correct match is located within the search window.

The search and correlate process in accordance with the present invention proceeds on the assumption that the contour of the surface of interest does not have large discontinuities, so that the parallax measurement from one pixel to another will also not be discontinuous. As a consequence, the parallax offset for one pixel can be used as an initial 'guess' or starting point for the parallax of a neighboring pixel. Centering the search window on this starting point will likely cause the pattern which most closely matches the image contents of the correlation pattern to be nearby, thereby allowing the search window to be kept to a reasonably small size. In the course of locating which pixels of the second array correspond to or 'tie' to starting points of the first image, however, since nothing is initially known about the parallax in this area of the image, the size of the first search window must be relatively large. This is particularly true since subsequent correlations will be based on the locations of the initial tie points in the second image array. Thus the locations of the tie points in the second image must be correct. A larger area first search window SW1, having a high signal-to-noise ratio, is used during this step of the process. The large signal-to-noise ratio is due to the large image pattern window employed (which, in turn, leads to a larger search window).

As shown in FIG. 4, first correlation window CW1 is initially centered within the search window SW1, so that it is centered about 'tentative' tie point pixel 26. For this and subsequent locations of first correlation window CW1 within first search window SW1, the image contents of correlation window CW1 are correlated with the contents of the first image pattern window IP1. While a number of images correlation functions that operate on two image can be used, such as the correlation intensity coefficient, the phase correlation coefficient and the Laplace coefficient, a preferred function is the normal product function since it has good immunity to low signal-to-noise ratios and requires significantly less time to compute than most of the other functions.

The normal product moment correlation function is:

$$C(\Delta x, \Delta y) = \frac{\sum_{i=1}^{N}\sum_{j=1}^{N}\{[I_1(X_i + \Delta x, Y_j + \Delta y) - \overline{T_1}][I_2(X_i, Y_j) - \overline{T_2}]\}^2}{\sum_{i=1}^{N}\sum_{j=1}^{N}[I_1(X_i + \Delta x, Y_j + \Delta y) - \overline{T_1}]^2 \sum_{i=1}^{N}\sum_{j=1}^{N}[I_2(X_i, Y_j) - \overline{T_2}]^2}$$

The value of this function is between 0.0 and 1.0, with larger values indicating better matches between the first pattern window and the first correlation window. This function is repeatedly evaluated as the correlation window is moved within the search window, with the final result being the location at which the correlation function has a maximum value.

Because the correlation process operates on image patterns, it is necessary that the pattern have sufficient definition or contrast, so that the likelihood is high that the results of the correlation will correctly identify the location of a contour point of interest. For this purpose, prior to stepping the correlation window through its search window, the contents of the image pattern are evaluated for sufficient contrast to form a pattern that can be recognized. An area of desert sand or open water, for example, may contain little, if any, contrast, and therefore be unsuitable for use as a correlation reference pattern. If the variance in the pattern window is less than a minimum specified threshold, namely the contents of image pattern window IP1 have less than a prescribed amount of contrast, then no attempt is initially made to process that image pattern.

If there is sufficient contrast within the image pattern window, then the process proceeds to shift or translate first correlation window CW1 through search window SW1. For each position of first correlation window CW1 within search window SW1, the image contents of correlation window CW1 are correlated with the image contents of its associated first image pattern window IP1 using the normal product moment function, set forth above, thereby deriving a correlation value for each position of the correlation window. For that location of correlation window CW1 producing the largest correlation output value, the center pixel of the correlation window CW1, shown at 26' in FIG. 4, is identified as the tie point of interest. However, again, as in the case of the requirement of minimum contrast in the image pattern window, the maximum correlation value must be above a minimum threshold, in order for the correlation output to be acceptable. If the correlation value is less than this threshold, then no attempt is made to process the tie point. The parallax of identified tie points 26' is then measured as the offset from the tentative points 26.

Figure 5:
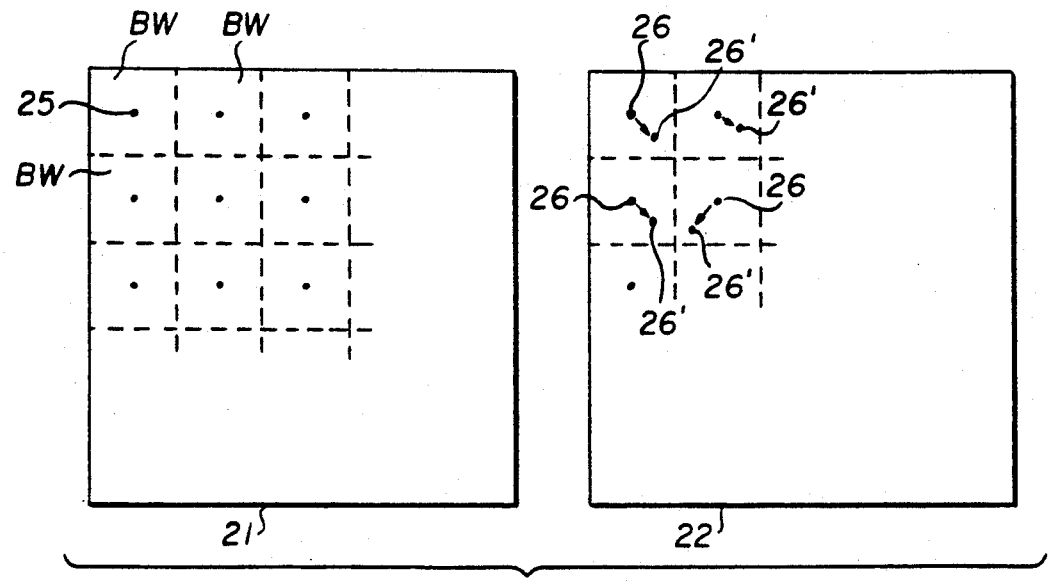
FIG. 5 illustrates a plurality of boundary windows of a first image array and associated groups of tie points identified within second image array for determining average parallax among plural tie points.

Before accepting the parallax measurements for the identified tie point pixels 26' of the second image array, the parallax measurement values resulting from the tie point correlation process are subjected to a spatial offset error detection function which analyzes the identified locations of tie point pixels 26' associated with starting point pixels 25 of a plurality or group of boundary windows BW that are defined about starting point pixels 25 of the first image array, as illustrated in FIG. 5. As shown therein, each boundary window BW contains a respective starting point pixel 25 and a plurality of neighboring pixels and borders the boundary windows of adjacent tie points. The average value of the measured parallax for groups or regions of first search windows SW1 within second image array 22 is measured and those identified tie point pixels 26' whose parallax differs from the average value of the measured parallax by more than the standard deviation are discarded. The parallax for each of the non-discarded tie points 26' is then employed to determine the parallax between remaining locations on the contoured surface as seen in the first digitized image 21 and corresponding locations on the contoured surface as seen in the second digitized image 22.

NEIGHBORHOOD CORRELATION: STEP 2

Neighborhood correlation operates upon the each of the pixels within the respective boundary windows BW for which valid tie points were identified during the tie point correlation sequence. Because a large number of pixels are to be processed, the size of the correlation window should be smaller than in the tie point correlation. While such a reduction will lower the signal-to-noise ratio of the function, since the search window is (indirectly) based upon a highly confident result, the potential for error is not significantly increased. Moreover, the size of the search window may also be reduced, since the parallax will not be discontinuous and the search window can be centered on the result from an adjacent pixel. Employing such smaller sized correlation and search windows dramatically reduces execution time for this portion of the process. As an illustrative example, the correlation window may encompass a $(5 \times 5)$ matrix and the search window may cover a $(9 \times 9)$ matrix as shown in FIG.

Figure 6:
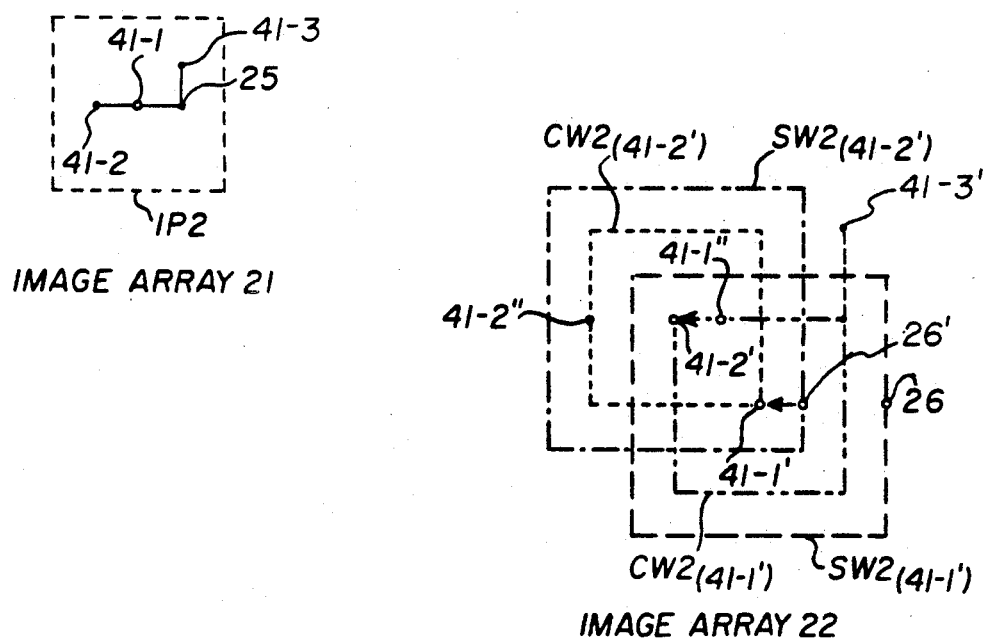
FIG. 6 shows a respective boundary window that contains a starting point pixel and a plurality of neighboring pixels.

As described above and as shown in FIG. 6, a respective boundary window BW contains a starting point pixel 25 and a plurality of neighboring pixels 41-1 . . . 41-n and is sized such that adjacent boundary windows border one another. The neighborhood search and correlate process begins at a pixel, such as pixel 41-1, adjacent to the starting point pixel 25 and operates to locate a corresponding pixel within the second array using, as an initial reference, the parallax that has been determined for tie point 26'.

For this purpose, the position of pixel 41-1 relative to starting point 25 is used to locate a pixel 41-1' within second image array 22 that is similarly located relative to tie point 26'. In the example shown in FIG. 6, pixel 41-1 is to the immediate left of starting point pixel 25. Consequently, a second search window SW2 is centered about pixel 41-1' within second image array 22 which is to the immediate left of tie point pixel 26'. A second image pattern window IP2 is centered about pixel 41-1 within its boundary window BW of the first image array 21 and its contrast is measured as in the case of the image pattern window used for tie point correlation, described above. Assuming that image pattern window IP2 contains a valid pattern, namely, there is sufficient contrast within the image pattern window, then its contents are correlated with those of a second correlation window CW2 within second search window, as the process successively translates the second correlation window CW2 through second search window SW2.

As in the tie point search, for each position of second correlation window CW2 within second search window SW2, the image contents of correlation window CW2 are correlated with the image contents of its associated second image pattern window IP2 using the normal product moment function, set forth above, thereby deriving a correlation value for each position of the correlation window. For that location of correlation window CW2 within search window SW2 producing the largest correlation output value, the center pixel of the correlation window CW2, shown in FIG. 6 at pixel 41-1'', is identified. Again, as in the case of the tie point search, the maximum correlation value must be above a minimum threshold, in order to the correlation output to be acceptable. If the correlation is less than this threshold, then no attempt is made to process the point. The parallax of identified point 41-1'' is then measured as the offset of identified point 41-1'' from pixel point 26 minus the offset of point 41-1 from pixel point 25. This procedure is then iteratively repeated for the remaining pixels in each boundary window, always using a high confidence identified pixel of the second image array as the starting point for centering the search window for the next correlation search.

Figure 7:
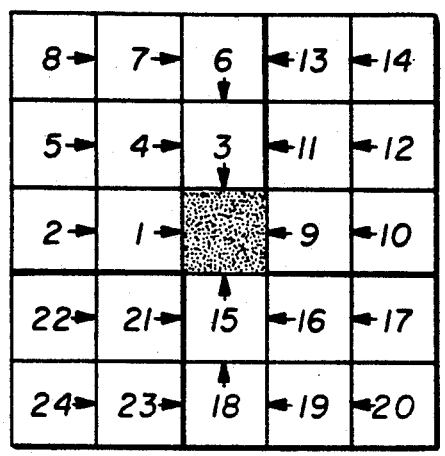
FIG. 7 shows a matrix of pixels surrounding a starting point pixel and arrows which indicate which previous result is to be used as the initial point for the search and correlate process for the next pixel.

As a reduced complexity illustration, FIG. 7 shows a boundary window BW comprised of a $(5 \times 5)$ matrix of pixels 41-1 ... 41-24 surrounding a starting point pixel 25. The arrows indicate which previous result is to be used as the initial point for the next pixel. Thus, for the case of the immediately previous result for pixel 41-1, the next pixel to be used to center image pattern window IP2 is shown as pixel 41-2, which is to immediate left of pixel 41-1 within boundary window BW. Therefore, second search window SW2 is now centered about pixel 41-2' within second image array 22 which is to the immediate left of the most recently identified pixel 41-1''. With second image pattern window IP2 centered about pixel 41-2, the contrast of its image pattern is measured. Assuming that image pattern window IP2 contains a valid pattern, then its pattern is correlated with the contents of second correlation window CW2 within second search window, as second correlation window CW2 is successively translated through second search window SW2 now centered about pixel 41-2'.

As in the previous search, for each position of second correlation window CW2 within second search window SW2, the image contents of correlation window CW2 are correlated with the image contents of its associated second image pattern window IP2 using the normal product moment function, set forth above, thereby deriving a correlation value for each position of the correlation window. For that location of correlation window CW2 within search window SW2 producing the largest correlation output value, the center pixel of the correlation window CW2, shown in FIG. 6 at pixel 41-2'', is identified. Again, the maximum correlation value must be above a minimum threshold, in order for the correlation output to be acceptable. If the correlation is less than this threshold, then no attempt is made to process the point. The parallax of identified point 41-2'' is then measured as the offset of identified point 41-2'' from pixel point 26 minus the offset of point 41-2 from pixel point 25 and the process proceeds to pixel 41-3, shown in FIG. 6 corresponding to point 3 in FIG. 7 as being directly above starting point pixel 25, and search window SW2 is correspondingly centered at pixel 41-3' shown in FIG. 6 directly above tie point pixel 26'.

It should be observed that centering each neighborhood of pixels about its tie point reduces the possibility of introducing errors by reducing the number of steps between the point for which the search and correlated sequence is to be conducted and the 'high confidence' placed on the location of the tie point, thereby minimizing the likelihood that the process will 'drift' away from the correct result.

Figure 8:
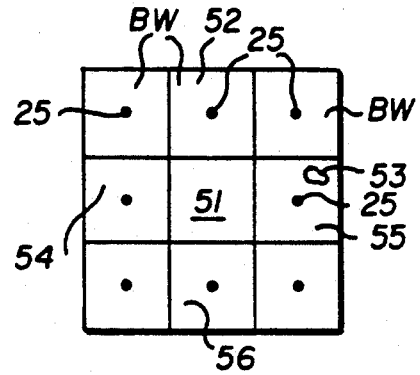
FIG. 8 shows an example of the results of the neighborhood correlation step, leaving pixel locations for which the search and correlation process failed to derive parallax values.

As described above, neighborhood correlation operates upon each of the pixels within respective boundary windows BW for which valid tie points were identified during the tie point correlation sequence. In some instances, however, the first image array will contain boundary windows for which tie points within the second image array were not found during tie point correlation. These initially discarded tie points will leave associated areas or regions of pixels within image array 22 without parallax values, as illustrated at region 51, for example, shown in FIG. 8. In addition, during the neighborhood correlation step, it can be expected that there will be pixel locations for which the correlation process failed to derive parallax values, as shown at 53 in region 55 in FIG. 8. The neighborhood recovery stage serves to correlate pixels in regions where no valid tie point was identified using correlated pixel values correlated from pixels along the edges of bordering boundary windows. Following this step, the process proceeds to iteratively fill in values for individual pixels remaining uncorrelated from the previous steps.

NEIGHBORHOOD RECOVERY: STEP 3

More particularly, for each starting point pixel 25 of first image array 21 for which no corresponding tie point pixel 26' within the second image array 22 was identified during the tie point correlation step, pixel data along the edges of bordering boundary windows is employed to identify pixels along adjacent edges of the region of interest These values, in turn, are then used to generate a more interior group of pixels, and so on until the tentative tie point is reached. This process is conducted, to the extent possible, from each edge of the boundary window.

Figure 9:
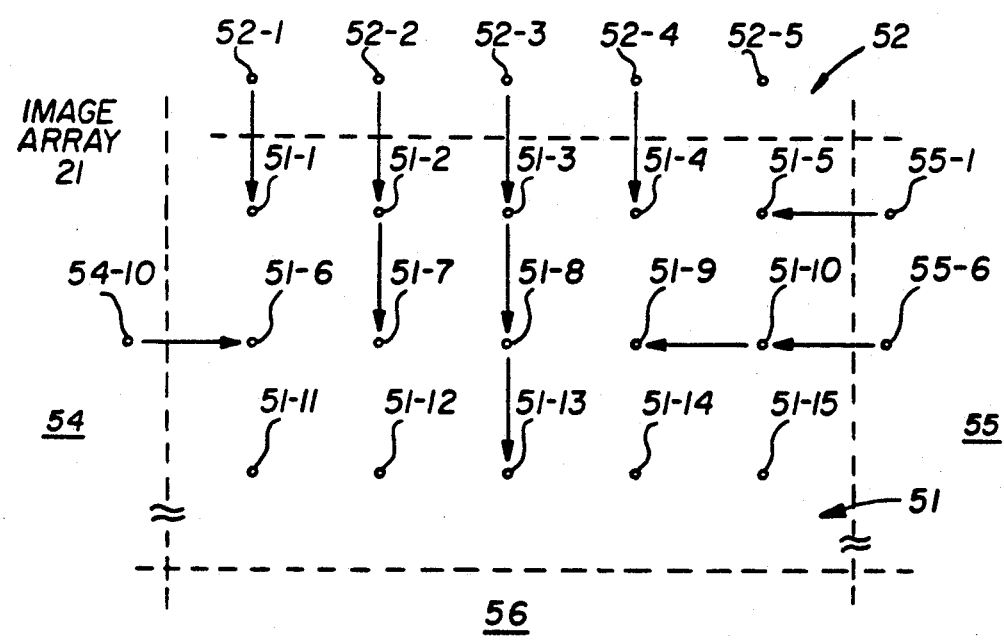
FIG. 9 shows a boundary window for which no associated valid tie point has been located in the second image array and a plurality of bordering boundary windows for which valid tie points and at least partially filled pixel values for their associated regions in the second image array were correlated during the neighborhood correlation step.
Figure 9:
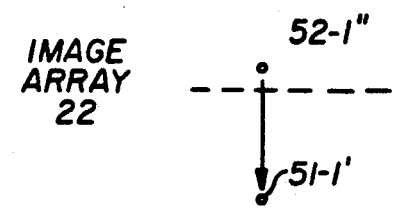

As a simplified example, FIG. 9 shows boundary window 51 for which no associated valid tie point was located in second image array 22, and a plurality of bordering boundary windows 52, 54, 55 and 56 for which valid tie points and at least partially filled pixel values for their associated regions in the second image array were correlated during the neighborhood correlation step. In order to derive pixel data for those pixel points along its border with boundary window, a respective 'nearest' edge pixel, such as pixel 52-1, of bordering boundary window 52, for which parallax data in the second image array has been derived, is used as a starting reference for a first edge pixel 51-1 of boundary window 51. Namely, as in the previous correlation steps, the position of pixel 51-1 relative to an already successfully correlated pixel location, here pixel 52-1, is used to locate a pixel 51-1', that is similarly located relative to pixel 52-1'', as shown in second image array 22 of FIG. 9. In FIG. 9, pixel 51-1 is immediately beneath pixel 52-1. Consequently, a third search window SW3 is centered about pixel 51-1' of second image array 22, pixel 51-1' being immediately beneath pixel location 52-1''.

A third image pattern window IP3 is centered about pixel 51-1 of the first image array 21 and its contrast is measured as in the case of image pattern window used for tie point correlation, described above. Assuming that third image pattern window IP3 contains a valid pattern, namely, there is sufficient contrast within the image pattern window, then its contents are correlated with those of a third correlation window CW3 within a third search window SW3, as the process successively translates the third correlation window CW3 through third search window SW3. As in the neighborhood correlation search, for each position of third correlation window CW3 within third search window SW2, the image contents of third correlation window CW3 are correlated with the image contents of its associated third image pattern window IP3 using the above-referenced normal product moment function, thereby deriving a correlation value for each position of correlation window CW3 within search window SW3. For that location of third correlation window CW3 within third search window SW3 producing the largest correlation output value, the center pixel of correlation window CW3 is identified. Again, as in previous searches, the maximum correlation value must be above a minimum threshold, in order for the correlation output to be acceptable. If the correlation is less than this threshold, then no attempt is made to process the point. The parallax of the identified point 51-1'' is then measured as the offset of identified point 51-1'' from pixel point 26 minus the offset of point 51-1 from pixel point 25. This procedure is then repeated for remaining pixels 51-2 . . . 51-4 along the edge in boundary window 51, always using a nearest previously identified pixel of the adjacent boundary window 52 as the starting point, using the neighborhood recovery order diagrammatically illustrated in FIG. 10.

Figure 10:
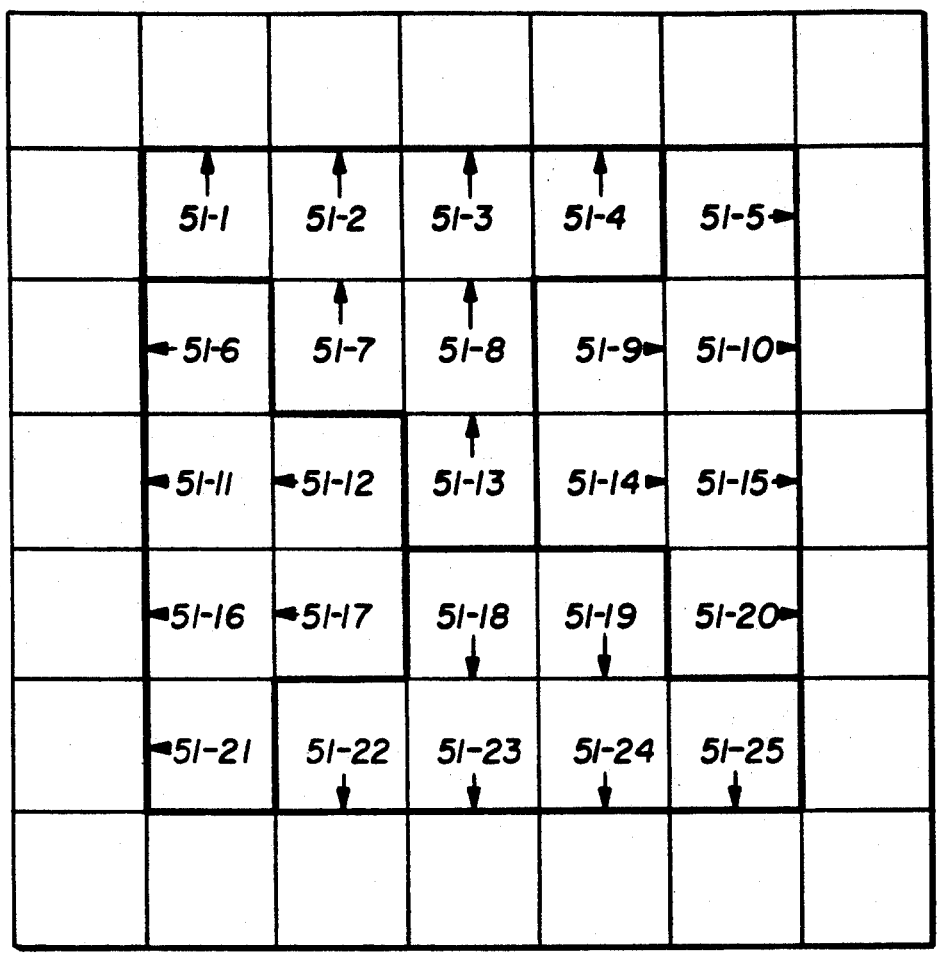
FIG. 10 diagrammatically illustrates a neighborhood recovery order for filling in pixels associated with a boundary window for which no associated valid tie point has been located in the second image array.

In accordance with the neighborhood recovery order shown in FIG. 10, when each of edge pixels 51-1 . . . 51-4 has been correlated, the process uses two of theses pixels, specifically pixel 51-2 and 51-3 to correlate values for immediately adjacent pixels 51-7 and 51-8, respectively, in the next interior pixel line containing pixels 51-6 . . . 51-10. However, pixels 51-6, 51-9 and 51-10 are not processed on the basis of the pixels 51-1, 51-4 and 51-5, respectively. Pixels 51-6 and 51-10 have nearest previously correlated pixels 54-10 and 55-6, respectively. Pixel 51-9 is referenced to pixel 51-10 to provide a reasonably symmetrical pixel correlation order. With the remaining pixels being processed in the order shown in FIG. 10, then, for the next (interiormost) line, only pixel 51-13 is processed based upon a previously processed pixel within boundary window 51, here based upon nearest neighboring pixel 51-8.

Figure 11:
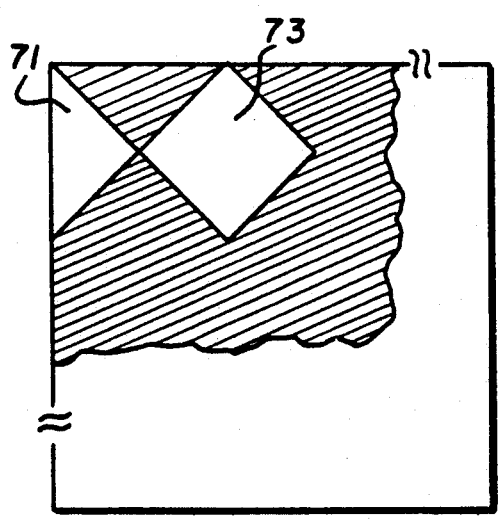
FIG. 11 illustrates how gaps may be left along one or more edges of boundary windows, where two uncorrelated boundary windows border one another.

To the extent that each uncorrelated boundary window has neighboring boundary windows containing correlated pixels, the process described above is carried out using the neighborhood recovery order shown in FIG. 10. Where two uncorrelated boundary windows border one another, gaps will be left along one or more edges of the boundary windows, as shown at 71 and 73 in FIG. 11. At this point in the process, local groups or neighborhoods of high confidence pixel locations that may be used as reference points for further processing have been effectively exhausted. To fill in remaining pixels in the image, an iterative sequence of overall image scans is conducted, using, as a starting point for any uncorrelated pixel, any correlated nearest neighbor pixel. In addition as successive scans of the image are executed, the size of both the search window and the correlation window are increased.

OVERALL IMAGE SCAN: STEP 4

Figure 12:
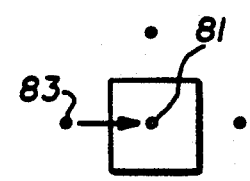
FIG. 12 diagrammatically illustrates how the overall image scan proceeds across and down the image from left-to-right, top-to-bottom, looking for uncorrelated pixels.
Figure 12:

More particularly, with reference to FIG. 12, the overall image scan proceeds across and down the image from left-to-right, top-to-bottom, looking for uncorrelated pixels. When any uncorrelated pixel is encountered, such as pixel 81, any nearest neighbor pixel for which a valid correlation has been obtained is used as the starting point of the search and correlate process. Namely, as in the previous correlation steps, the position of pixel 81 relative to an already successfully correlated pixel location, such as pixel 83 to the immediate left of pixel 81, is used to locate a pixel 81' within second image array 22, that is similarly located relative to pixel 83", as shown in second image array 22 of FIG. 12. In FIG. 12, pixel 81 is to the immediate right of valid pixel 83. Consequently, a fourth search window SW4 is centered about pixel 81' within second image array 22, pixel 81' being to the immediate right of location 83".

A fourth image pattern window IP4, which is preferably the same size as third image pattern window (e.g. a 7×7 matrix) is centered about pixel 81 within first image array 21 and its contrast is measured, as described above. Assuming that fourth image pattern window IP4 contains sufficient contrast to provide a valid pattern, then its contents are correlated with those of a fourth correlation window CW4 within a fourth search window SW4, as the process successively translates the fourth correlation window CW4 through fourth search window SW4. Fourth search window SW4 is the same size as the third search window and may encompass, for the illustrated example, a (9×9) matrix. As in the previous searches, for each position of fourth correlation window CW4 within fourth search window SW4, the image contents of fourth correlation window CW4 are correlated with the image contents of its associated fourth image pattern window IP4 using the above-referenced normal product moment function, thereby deriving a correlation value for each position of correlation window CW4 within the search window. Again, for that location of the correlation window within the search window producing the largest correlation output value, the center pixel of the correlation window is identified. Also, as in previous searches, the maximum correlation value must be above a minimum threshold, in order for the correlation output to be acceptable. If the correlation is less than this threshold, then no attempt is made to process the point. The parallax of the identified point 81" is then measured as the offset of identified point 81" from pixel point 26 minus the offset of point 81 from pixel point 25. This procedure is then repeated for remaining uncorrelated pixels of the image during this first scan, always using a nearest previously identified pixel as the starting point.

After a first pass through the image in a left-to-right, top-to-bottom scan of the image, filling in, to the extent possible, uncorrelated pixels, the image is again retraced, but following a different traverse of the image, e.g. right-to-left, bottom-to-top, and using increased search and correlation window sizes, such as an (11×11) correlation matrix and a (13×13) search window. Namely, successive rescans of the image are conducted from opposite directions and with increasingly larger correlation and search windows, such that the maximum change in parallax from the neighboring pixel point remains constant. Thus, as in the case of the foregoing examples, a larger correlation window (15×15) would have an (17×17) search window and so on. It turns out that after a sequence of three overall scans of the image, parallax values for a very high percentage of those pixels having significant contrast will have been determined.

In order to detect and correct for local inconsistencies and discontinuities in the parallax data derived during the overall scan process and previous search and correlation steps, between the bottom-to-top, right-to-left return scan and a following repeat of the left-to-right, top-to-bottom scan (using a (15×15) correlation window and a (17×17) search window), the parallax values of each correlated pixel and those of neighboring pixels whose parallax differ by two or more are subjected to the previously described standard deviation comparison used for tie points. Any parallax value that differs by more than one standard deviation is discarded. Then, in the following repeat of the left-to-right, top-to-bottom scan (using a (15×15) correlation window and a (17×17) search window) any such discarded pixels will have the opportunity to be recorrelated. Indeed, since this scan employs a very large correlation window having high signal-to-noise ratio, the recorrelated pixels are much more likely to be correct.

SUB-PIXEL INTERPOLATION

As a further enhancement of the above process, the derived parallax values may be subjected to an interpolation function to sub-pixel accuracies. The correlation window can be moved only in integral steps of one pixel per step within the search window, and because a difference in parallax of one pixel may result in a substantial change in elevation, it is preferred that the parallax be determined to sub-pixel accuracies. This is accomplished by using a Lagrange polynomial interpolation on the values returned by the correlation function to determine where the local maxima is located. This interpolation function calculates the value of the correlation function at the integral step with the maximum value (the stored parallax result) and at two points on either side of the maximum. These (three) values are then used in a second order Lagrange polynomial to interpolate the position (between integral pixel steps) at which the local maxima occurs. This fractional parallax value is then stored as the final result of the correlation process. It should be observed that this interpolation can only be executed on points which were successfully correlated in a preceding step; points which remain uncorrelated will not be affected by this process.

Once the parallax between the first and second image arrays has been derived, elevations can be computed using a conventional parallax-dependent mechanism. One example of a suitable mechanism for this purpose is the equation:

$$h_A = H - (B^*f)/P_A$$

where H is the height of the image sensor above the surface, B is the distance between the positions when the stereo image pair was captured, f is the effective focal length of the sensor and $P_A$ is the parallax. For points which do not have a computed parallax value, elevation is interpolated from neighboring points. The interpolation mechanism calculates a weighted average of known elevation points which appear above, below, to the left and to the right of the point of interest and employs this value in lieu of a parallax-based elevation value.

As will be appreciated from the foregoing description, the resolution and precision limitations of conventional parallax determination techniques are obviated in accordance with the digitized image processing mechanism of the present invention which, by means of an iterative image pattern search and correlation process, which is able to rapidly determine the parallax for each pixel that is common to the images captured by a stereo image pair. By the initial use of a dispersed sub-array of reference point pixels distributed throughout a first image array, a similarly dispersed sub-array of tie points, to be used as starting points for subsequent, more densely populated search and correlation steps, can be rapidly obtained for the second image array. The derived parallax values may then be subjected to an interpolation function to sub-pixel accuracies. Once the parallax between the first and second image arrays has been derived, elevations can be computed using a conventional parallax-dependent mechanism.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a digitized image processing system wherein first and second digitized images respectively representative of first and second views of a contoured surface as seen from first and second respectively different look angles are generated, said first and second digitized images containing respective first and second arrays of image pixels, a method of determining parallax between locations on said contoured surface as seen in said first digitized image and corresponding locations on said contoured surface as seen in said second digitized image, comprising the steps of:

(a) correlating image contents of a plurality of first image pattern windows distributed throughout said first array, each first image pattern window containing a respective sub-array of pixels of said first array, with image contents of respective first correlation windows positioned at locations including initial and subsequent correlation windows positioned at respective initial and subsequent locations, each first correlation window containing a respective sub-array of pixels of said second array, by different placements of said first correlation windows within a plurality of first search windows distributed throughout said second array to determine the locations, where said different placements of the first correlation windows include initial different placements of the initial correlation window within the initial search window to determine the initial location of the initial correlation window, and subsequent different placements of the subsequent correlation window within the subsequent search window to determine the subsequent location of the subsequent correlation window responsive to one of an initial parallax responsive to the initial location and a subsequent parallax;

(b) identifying, on the basis of correlations carried out in step (a), an initial pixel of said second array representing an initial location on said contoured surface corresponding to an initial prescribed pixel of said first array responsive to said initial different placements, and identifying, on the basis of correlations carried out in step (a), pixels of said second array representing locations on said contoured surface that correspond to prescribed pixels of said first array responsive to said subsequent different placements;

(c) determining the initial parallax between the initial pixel and the initial prescribed pixel, and determining the parallax between respective ones of the prescribed pixels of said first array and the pixels of said second array; and (d) determining the parallax between locations on said contoured surface as seen in said first digitized image and corresponding locations on said contoured surface as seen in said second digitized image, in accordance with the initial parallax and the parallax determined in step (c).

2. A method according to claim 1, wherein step (d) comprises the steps of:

(d1) defining a boundary window about each of the prescribed pixels of said first array, such that a respective boundary window contains a respective prescribed pixel and a plurality of neighboring pixels and such that adjacent boundary windows border one another; and (d2) determining the parallax between pixels contained in respective boundary windows and corresponding pixels of said second array, in accordance with the parallax determined in step (c).

3. A method according to claim 2, wherein step (d2) comprises the steps of:

(d2-1) using a respective pixel of said second array identified in step (b) as a reference pixel, correlating the image contents of a second image pattern window, which contains a pixel adjacent to a prescribed pixel and a plurality of neighboring pixels of said first array, with the image contents of a respective second correlation window, said second correlation window containing a pixel displaced with respect to said reference pixel of said second array, in the same manner that said adjacent pixel is displaced with respect to said prescribed pixel of said first array, and a plurality of neighboring pixels of said second array, for different placements of said second correlation window within a second search window of said second array;

(d2-2) on the basis of correlation carried out in step (d2-1), identifying which pixel of said second array represents a location on said contoured surface that corresponds to said adjacent pixel within said boundary window of said first array;

(d2-3) determining the parallax between said adjacent pixel of said first array and the pixel of said second search window identified in step (d2-1); and (d2-4) using a respective pixel of said second array identified in step (d2-2) as a reference pixel, repeating steps (d2-1)–(d2-3) for the remaining pixels of each respective boundary window.

4. A method according to claim 2, wherein step (a) comprises measuring the contrast within said first image pattern window, and wherein steps (b)–(d) are carried out with respect to said first image pattern window in response to the value of the measured contrast being greater than a prescribed contrast value.

5. A method according to claim 4, wherein step (c) includes the steps of measuring the parallax between respective identified pixels of said first search windows and associated prescribed pixels of said first array, determining the average value of said measured parallax for a plurality of first search windows, and discarding those identified pixels whose parallax differs from said average value of said measured parallax by a prescribed difference.

6. A method according to claim 5, wherein said prescribed difference corresponds to the standard deviation.

7. A method according to claim 3, further including the step of:

(e) for each of the prescribed pixels of said first array for which corresponding pixels of said second array were not identified in step (b), each of such prescribed pixels having an associated boundary window as defined in step (d1), determining the parallax between pixels contained in said associated boundary window and corresponding pixels of said second array, in accordance with the parallax determined in step (d2-4) between locations on said contoured surface as seen in said first digitized image and corresponding locations on said contoured surface as seen in said second digitized image.

8. A method according to claim 7, wherein step (e) comprises the steps of:

(e1) for a respective pixel belonging to an associated boundary window, locating a corresponding pixel of said second array in accordance with the geometric relationship between said respective pixel and a neighboring pixel the parallax between which and a corresponding pixel of said second array has been determined;

(e2) for each respective pixel of said second array located in step (e1), defining a third search window containing that pixel and a plurality of neighboring pixels;

(e3) for a respective pixel belonging to said associated boundary window, defining a third image pattern window containing said respective pixel and a plurality of neighboring pixels, such that the size of said third image pattern window is less than the size of said third search window;

(e4) defining, within said third search window, a third correlation window sized in correspondence with said third image pattern correlation window;

(e5) for respectively different locations of said third correlation window within said third search window, correlating the contents of said third correlation window with the contents of said third image pattern window;

(e6) specifying which pixels among the image pixels of said third search window are associated with locations on said contoured surface represented by pixels of said associated boundary window, in accordance with the correlation carried out in step (e5); and (e7) determining the parallax between locations on said contoured surface as seen in said first digitized image and corresponding locations on said contoured surface as seen in said second digitized image in accordance with separations between respective pixels of said associated boundary window and image pixels of said third search window specified in step (e6).

9. A method according to claim 8, wherein step (e1) comprises, for a respective pixel belonging to an associated boundary window, locating a corresponding pixel of said second array in accordance with the geometric relationship between said respective pixel and a pixel of a neighboring boundary window.

10. A method according to claim 7, further including the step of:

(f) for each of remaining pixels of said first array, for which parallax with pixels of said second array has not been determined through step (e), determining the parallax between such pixels and corresponding pixels of said second array in accordance with the parallax by the steps of (f1) for a respective remaining pixel, locating a corresponding pixel of said second array in accordance with the geometric relationship between said respective remaining pixel and an adjacent pixel the parallax between which and a corresponding pixel of said second array has been determined;

(f2) for each respective corresponding pixel of said second array located in step (f1), defining a fourth search window containing said respective corresponding pixel and a plurality of neighboring pixels;

(f3) for a respective remaining pixel, defining a fourth image pattern window containing said respective remaining pixel and a plurality of neighboring pixels, such that the size of said fourth image pattern window is less than the size of said fourth search window;

(f4) defining, within said fourth search window, a fourth correlation window sized in correspondence with said fourth image pattern window;

(f5) for respectively different locations of said fourth correlation window within said fourth search window, correlating the contents of said fourth correlation window with the contents of said fourth image pattern window;

(f6) specifying which pixels among the image pixels of said fourth search window are associated with locations on said contoured surface represented by remaining pixels of said first array, in accordance with the correlation carried out in step (f5); and (f7) determining the parallax between locations on said contoured surface as seen in said first image and corresponding locations on said contoured surface as seen in said second digitized image in accordance with separations between respective pixels of said first array and image pixels of said fourth search window specified in step (f6).

11. A method according to claim 10, further comprising repeating steps (f1)–(f7) using correlation and search windows of progressively larger sizes.

12. A method according to claim 10, further comprising repeating steps (f1)–(f7) using a different traverse of said first and second pixel arrays.

13. A method according to claim 1, further including the step of (e) determining parallax for sub-pixels of said image by interpolating the parallax values derived in step (d).

14. A method according to claim 13, wherein step (e) comprises determining a correlation value for an integral pixel step at a maximum value of parallax and at two points on either side of the maximum, and processing the correlation values to interpolate the position between integral pixel steps at which the local maxima occurs.

15. A method according to claim 1, further including the step of (e) determining elevations of locations on said contoured surface in accordance with the parallax determined in step (d).

16. For use with a digitized image processing system wherein first and second digitized images respectively representative of first and second views of a contoured surface as seen from first and second respectively different look angles are generated, said first and second digitized images containing respective first and second arrays of image pixels, a method of determining parallax between locations on said contoured surface as seen in said first image and locations on said contoured surface as seen in said second image, comprising the steps of:

(a) defining a first sub-array of pixels of said first image of said contoured surface, said first sub-array of pixels encompassing that portion of said contoured surface seen in both of said first and second images;

(b) defining a first image pattern window and a subsequent image pattern window about each of the pixels of said first sub-array, such that a respective first image pattern window contains a respective pixel of said first sub-array and a plurality of neighboring pixels;

(c) defining a plurality of first search windows including respective first and subsequent search windows among said second array of image pixels, each of said first search windows encompassing a respectively different second sub-array of pixels of said second image that contains a pixel located geometrically proximate to the location of a respective pixel of said first sub-array of pixels of said first image, the size of a first search window being larger than the first image pattern window;

(d) defining, within the respective first search window, a first comparison window sized in correspondence with said first image pattern window, and within the subsequent search window, a subsequent comparison window;

(e) comparing, for respectively different initial locations of the first comparison window within the respective first search window, the contents of said first image pattern window with the contents of said first comparison window to determine an initial location of the first comparison window within the respective first search window, and comparing, for respectively different subsequent locations of the subsequent comparison window within the subsequent search window, the contents of the subsequent image pattern window with the contents of said subsequent comparison window to determine a subsequent location of the subsequent comparison window responsive to one of an initial parallax responsive to the initial location and an adjacent parallax;

(f) specifying an initial pixel of said second array representing an initial surface location on said contoured surface corresponding to an initial respective first pixel of said first sub-array of pixels of said first image, and specifying which pixels among the image pixels of said second array represent locations on said contoured surface corresponding to the respective pixels of said first sub-array of pixels of said first image, in accordance with the comparison carried out in step (e); and (g) determining the parallax between locations on said contoured surface as captured by said first image with corresponding locations on said contoured surface as captured by said second image in accordance with separations between respective pixels of said first sub-array and the initial pixel and the pixels of the image pixels of said second array specified in step (f).

17. A method according to claim 16, wherein step (g) comprises the steps of:

(g1) defining a boundary window about each of the pixels of said first sub-array, such that a respective boundary window contains a respective pixel of said first sub-array and a plurality of neighboring pixels and such that adjacent boundary windows border one another; and (g2) for each pixel of said first sub-array, for which a respective pixel of said second sub-array has been specified in step (f), determining the parallax between pixels contained in its associated boundary window and corresponding pixels of said second array in accordance with separations between respective pixels of said first sub-array and those pixels of said second array specified in step (f).

18. A method according to claim 17, wherein step (g2) comprises the steps of:

(g2-1) for each pixel belonging to a respective boundary window defined in step (g1), locating a respective pixel of said second array in accordance with the separation between the pixel of said first sub-array belonging to said respective boundary window and a pixel of said second array specified in step (f);

(g2-2) for each respective pixel of said second array located in step (g2-1), defining a second search window containing that pixel and a plurality of neighboring pixels;

(g2-3) for each pixel of said respective boundary window for which a respective pixel of said second array has been located in step (g2-1), defining a second image pattern window containing said each pixel and a plurality of neighboring pixels, such that the size of said second image pattern window is less than the size of said second search window;

(g2-4) defining, within said second search window, a second comparison window sized in correspondence with said second image pattern window;

(g2-5) for respectively different locations of said second comparison window within said second search window, comparing the contents of said second comparison window with the contents of said second image pattern window;

(g2-6) specifying which pixels among the image pixels of said second search window are associated with locations on said contoured surface represented by pixels of said boundary window, in accordance with the comparison carried out in step (g2-5); and (g2-7) determining the parallax between locations on said contoured surface as seen in said first image and corresponding locations on said contoured surface as seen in said second image in accordance with separations between respective pixels of said boundary window and image pixels of said second search window specified in step (g2-6).

19. A method according to claim 16, wherein
step (c) comprises defining a plurality of first search windows among said second array of image pixels, each of said first search windows encompassing a respectively different second sub-array of pixels of said second image that contains a pixel located geometrically proximate to the location of a respective pixel of said first sub-array of pixels of said first images, the size of a first search window being larger than a first image pattern window, step (d) comprises defining said first comparison window as a first correlation window sized in correspondence with said first image pattern window, step (e) comprises, for respectively different locations of said first correlation window within a respective first search window, correlating the contents of said first correlation window with the contents of said first image pattern window, and wherein step (f) comprises specifying which pixel among the pixels of said first search window represents that location on said contoured surface corresponding to a respective pixel of said first sub-array of pixels of said first image, in accordance with the location of the said first correlation window within said first search window for which the value of the correlation produced by step (e) is largest.

20. A method according to claim 19, wherein step (b) comprises measuring the contrast within said first image pattern window, and wherein steps (c)-(f) are carried out with respect to a respective pixel of said first sub-array in response to the value of the measured contrast being greater than a prescribed contrast value.

21. A method according to claim 19, wherein step (f) includes the steps of measuring the parallax between said specified pixels and associated pixels of said first sub-array, determining the average value of said measured parallax for a plurality of first search windows, and discarding those specified pixels whose parallax differs from said average value of said measured parallax by a prescribed difference.

22. A method according to claim 21, wherein said prescribed difference corresponds to the standard deviation.

23. A method according to claim 19, wherein step (g) comprises the steps of:

(g1) defining a boundary window about each of the pixels of said first sub-array, such that a respective boundary window contains a respective pixel of said first sub-array and a plurality of neighboring pixel and such that adjacent boundary windows border one another; and (g2) for each pixel of said first sub-array, for which a respective pixel of said second sub-array has been specified in step (f), determining the parallax between pixels contained in its associated boundary window and corresponding pixels of said second array in accordance with separations between respective pixels of said first sub-array and those pixels of said second array specified in step (f).

24. A method according to claim 23, wherein step (g2) comprises the steps of:

(g2-1) for each pixel belonging to a respective boundary window defined in step (g1), locating a respective pixel of said second array in accordance with the parallax between the pixel of said first sub-array belonging to said respective boundary window and a pixel of said second array specified in step (f);

(g2-2) for each respective pixel of said second array located in step (g2-1), defining a second search window containing that pixel and a plurality of neighboring pixels;

(g2-3) for each pixel of said respective boundary window for which a respective pixel of said second array has been located in step (g2-1), defining a second image pattern window containing said each pixel and a plurality of neighboring pixels, such that the size of said second image pattern window is less than the size of said second search window;

(g2-4) defining, within said second search window, a second correlation window sized in correspondence with said second image pattern window;

(g2-5) for respectively different locations of said second correlation window within said second search window, correlating the contents of said second correlation window with the contents of said second image pattern window;

(g2-6) specifying which pixels among the image pixels of said second search window are associated with locations on said contoured surface represented by pixels of said boundary window, in accordance with the correlation carried out in step (g2-5); and (g2-7) determining the parallax between locations on said contoured surface as seen in said first image and corresponding locations on said contoured surface as seen in said second image in accordance with separations between respective pixels of said boundary window and image pixels of said second search window specified in step (g2-6).

25. A method according to claim 24, wherein step (g2-3) comprises measuring the contrast within said second image pattern window, and wherein steps (g2-4)–(g2-7) are carried out with respect to pixels of a respective first boundary window in response to the value of the measured contrast within said second image pattern window being greater than a predetermined contrast value.

26. A method according to claim 18, further including the step of:
(h) for each of the pixels of said first sub-array for which corresponding pixels of said second array were not specified in step (f) each of such pixels of said first sub-array having an associated boundary window as defined in step (g1), determining the parallax between pixels contained in said associated boundary window and corresponding pixels of said second array in accordance with the parallax determined in step (g2-7) between locations on said contoured surface as seen in said first image and corresponding locations on said contoured surface as seen in said second image.

27. A method according to claim 26, wherein step (h) comprises the steps of:
(h1) for a respective pixel belonging to an associated boundary window, locating a corresponding pixel of said second array in accordance with the geometric relationship between said respective pixel and a neighboring pixel the parallax between which and a corresponding pixel of said second array has been determined;
(h2) for each respective pixel of said second array located in step (h1), defining a third search window containing that pixel and a plurality of neighboring pixels;
(h3) for a respective pixel belonging to said associated boundary window, defining a third image pattern window containing said respective pixel and a plurality of neighboring pixels, such that the size of said image pattern window is less than the size of said third search window;
(h4) defining, within said third search window, a third correlation window sized in correspondence with said third image pattern window;
(h5) for respectively different locations of said third correlation window within said third search window, correlating the contents of said third correlation window with the contents of said third image pattern window;
(h6) specifying which pixels among the image pixels of said third search window are associated with locations on said contoured surface represented by pixels of said associated boundary window, in accordance with the correlation carried out in step (h5); and
(h7) determining the parallax between locations on said contoured surface as seen in said first image and corresponding locations on said contoured surface as seen in said second image in accordance with separations between respective pixels of said associated boundary window and image pixels of said third search window specified in step (h6).

28. A method according to claim 27, wherein step (h1) comprises, for a respective pixel belonging to an associated boundary window, locating a corresponding pixel of said second array in accordance with the geometric relationship between said respective pixel and a pixel of a neighboring boundary window.

29. A method according to claim 27, further including the step of:
(i) for each of remaining pixels of said first array, for which parallax with pixels of said second array has not been determined through step (h), determining the parallax between such pixels and corresponding pixels of said second array in accordance with the parallax by
(i1) for a respective remaining pixel, locating a corresponding pixel of said second array in accordance with the geometric relationship between said respective remaining pixel and an adjacent pixel the parallax between which and a corresponding pixel of said second array has been determined;
(i2) for each respective corresponding pixel of said second array located in step (i1), defining a fourth search window containing said respective corresponding pixel and a plurality of neighboring pixels;
(i3) for a respective remaining pixel, defining a fourth image pattern window containing said respective remaining pixel and a plurality of neighboring pixels, such that the size of said fourth image pattern window is less than the size of said fourth search window;
(i4) defining, within said fourth search window, a fourth correlation window sized in correspondence with said fourth image pattern window;
(i5) for respectively different locations of said fourth correlation window within said fourth search window, correlating the contents of said fourth correlation window with the contents of said fourth image pattern window;
(i6) specifying which pixels among the image pixels of said fourth search window are associated with locations on said contoured surface represented by remaining pixels of said first array, in accordance with the correlation carried out in step (i5); and
(i7) determining the parallax between locations on said contoured surface as seen in said first image and corresponding locations on said contoured surface as seen in said second image in accordance with separations between respective pixels of said first array and image pixels of said fourth search window specified in step (i6).

30. A method according to claim 29, further comprising repeating steps (i1)–(i7) using correlation and search windows of progressively larger sizes.

31. A method according to claim 29, further comprising repeating steps (i1)–(i7) using a different traverse of said first and second pixel arrays.

32. A method according to claim 16, further including the step of (e) determining parallax for sub-pixels of said image by interpolating the parallax values derived in step (d).

33. A method according to 32, wherein step (e) comprises determining a correlation value for an integral pixel step at a maximum value of parallax and at two points on either side of the maximum, and processing the correlation values to interpolate the position between integral pixel steps at which the local maxima occurs.

34. A method according to claim 16, further including the step of (e) determining elevations of locations on said contoured surface in accordance with the parallax determined in step (d).

35. For use with a digitized image processing system wherein first and second digitized images respectively representative of first and second views of a contoured surface as seen from first and second respectively different look angles are generated, said first and second digitized images containing respective first and second arrays of images pixels, a method of determining parallax between locations on said contoured surface as seen in said first digitized image and corresponding locations on said contoured surface as in said second digitized image, comprising the steps of:

(a) defining, within said first array of image pixels, a sub-array of reference pixels, said sub-array of reference pixels being distributed over that portion of said contoured surface contained in both of said first and second digitized images;

(b) defining, about each respective reference pixel of said sub-array, a respective first image pattern window and a subsequent image pattern window, such that the respective first image pattern window contains a respective reference pixel and a plurality of neighboring pixels;

(c) defining a plurality of first search window including respective first and subsequent search windows distributed among said second array of pixels, each of said first search window encompassing a respectively different plurality of pixels that contains a tentative tie point pixel located geometrically proximate to the location of a respective reference pixel of said sub-array, a size of a first search window being larger than a first image pattern window;

(d) defining, within the respective first search window, a first correlation window sized in correspondence with said first image pattern window and within the subsequent search window, a subsequent correlation window;

(e) correlating, for respectively different initial locations of the first correlation window within the respective first search window, the contents of said first correlation window with the contents of said first image pattern window to determine an initial location of the first correlation window within the respective first search window, and correlating, for respectively different subsequent locations of the subsequent correlation window within the subsequent search window, the contents of the subsequent image pattern window with the contents of said subsequent correlation window to determine a subsequent location of the subsequent correlation window responsive to one of an initial parallax responsive to the initial location and an adjacent parallax;

(f) identifying an initial pixel of said second array representing an initial surface location on said contoured surface corresponding to an initial respective first pixel of said sub-array, and identifying which pixels, among the image pixels of said second array, represent locations on said contoured surface that correspond to the respective reference pixels of the sub-array, in accordance with correlations carried out in step (e);

(g) determining the parallax between respective identified tie point pixels and associated tentative tie point pixels including the initial pixel and the pixels of said second array identified in step (f); and (h) determining the parallax between locations on said contoured surface as seen in said first digitized image and corresponding locations on said contoured surface as seen in said second digitized image, in accordance with the parallax, determined in step (g).

36. A method according to claim 35, wherein step (h) comprises the steps of:

(h1) defining a boundary window about each of said reference pixels, such that a respective boundary window contains a respective reference pixel and a plurality of neighboring pixels and such that adjacent boundary windows border one another; and (h2) determining the parallax between pixels contained in respective boundary windows and corresponding pixels of said second array, in accordance with the parallax determined in step (g) between respective tentative tie point pixels and identified tie point pixels identified in step (f).

37. A method according to claim 36, wherein step (h2) comprises the steps of:

(h2-1) for each pixel belonging to a respective boundary window defined in step (h1), locating a respective pixel of said second array in accordance with the parallax determined in step (g);

(h2-2) for each respective pixel of said second array located in step (h2-1), defining a second search window containing said each respective pixel and a plurality of neighboring pixels;

(h2-3) for each pixel of a respective boundary window for which a respective pixel of said second array has been located in step (h2-1), defining a second image pattern window containing said each pixel and a plurality of neighboring pixels, such that the size of said second image pattern window is less than the size of said second search window;

(h2-4) defining, within said second search window, a second correlation window sized in correspondence with said second image pattern window;

(h2-5) for respectively different locations of said second correlation window within said second search window, correlating the contents of said second correlation window with the contents of said second image pattern window;

(h2-6) identifying which pixels among the image pixels of said second search window are associated with locations on said contoured surface represented by pixels of said boundary window, in accordance with the correlations carried out in step (h2-5); and (h2-7) determining the parallax between locations on said contoured surface as seen in said first digitized image and corresponding locations on said contoured surface as seen in said second digitized image in accordance with separations between respective pixels of said boundary window and image pixels of said second search window identified in step (h2-6).

38. A method according to claim 37, wherein step (b) comprises measuring the contrast within said first image pattern window, and wherein steps (c)–(g) are carried out with respect to a respective reference pixel in response to the value of the measured contrast being greater than a prescribed contrast value.

39. A method according to claim 38, wherein step (f) includes the steps of measuring the parallax between said identified pixels and associated tentative tie point pixels, determining the average value of said measured parallax for a plurality of first search windows, and discarding those identified tie point pixels whose parallax differs from said average value of said measured parallax by a prescribed difference.

40. A method according to claim 39, wherein said prescribed difference corresponds to the standard deviation.

41. A method according to claim 37, further including the step of:
- (i) for each of said reference pixels for which corresponding pixels of said second array were not identified in step (f), each of such reference pixels having an associated boundary window as defined in step (h1), determining the parallax between pixels contained in said associated boundary window and corresponding pixels of said second array in accordance with the parallax determined in step (h2-7) between locations on said contoured surface as seen in said first digitized image and corresponding locations on said contoured surface as seen in said second digitized image.

42. A method according to claim 41, wherein step (i) comprises the steps of:
- (i1) for a respective pixel belonging to an associated boundary window, locating a corresponding pixel of said second array in accordance with the geometric relationship between said respective pixel and a neighboring pixel the parallax between which and a corresponding pixel of said second array has been determined;
- (i2) for each respective pixel of said second array located in step (i1), defining a third search window containing that pixel and a plurality of neighboring pixels;
- (i3) for a respective pixel belonging to said associated boundary window, defining a third image pattern window containing said respective pixel and a plurality of neighboring pixels, such that the size of said third image pattern window is less than the size of said third search window;
- (i4) defining, within said third search window, a third correlation window sized in correspondence with said third image pattern window;
- (i5) for respectively different locations of said third correlation window within said third search window, correlating the contents of said third correlation window with the contents of said third image pattern window;
- (i6) specifying which pixels among the image pixels of said third search window are associated with locations on said contoured surface represented by pixels of said associated boundary window, in accordance with the correlation carried out in step (i5); and
- (i7) determining the parallax between locations on said contoured surface as seen in said first digitized image and corresponding locations on said contoured surface as seen in said second digitized image in accordance with separations between respective pixels of said associated boundary window and image pixels of said third search window specified in step (i6).

43. A method according to claim 42, wherein step (i1) comprises, for a respective pixel belonging to an associated boundary window, locating a corresponding pixel of said second array in accordance with the geometric relationship between said respective pixel and a pixel of a neighboring boundary window.

44. A method according to claim 42, further including the step of:
- (j) for each of remaining pixels of said first array, for which parallax with pixels of said second array has not been determined through step (i), determining the parallax between such pixels and corresponding pixels of said second array in accordance with the parallax by
- (j1) for a respective remaining pixel, locating a corresponding pixel of said second array in accordance with the geometric relationship between said respective remaining pixel and an adjacent pixel the parallax between which and a corresponding pixel of said second array has been determined;
- (j2) for each respective corresponding pixel of said second array located in step (j1), defining a fourth search window containing said respective corresponding pixel and a plurality of neighboring pixels;
- (j3) for a respective remaining pixel, defining a fourth image pattern window containing said respective remaining pixel and a plurality of neighboring pixels, such that the size of said fourth image pattern window is less than the size of said fourth search window;
- (j4) defining, within said fourth search window, a fourth correlation window sized in correspondence with said fourth image pattern window;
- (j5) for respectively different locations of said fourth correlation window within said fourth search window, correlating the contents of said fourth correlation window with the contents of said fourth image pattern window;
- (j6) specifying which pixels among the image pixels of said fourth search window are associated with locations on said contoured surface represented by remaining pixels of said first array, in accordance with the correlation carried out in step (j5); and
- (j7) determining the parallax between locations on said contoured surface as seen in said first image and corresponding locations on said contoured surface as seen in said second digitized image in accordance with separations between respective pixels of said first array and image pixels of said fourth search window specified in step (j6).

45. A method according to claim 44, further comprising repeating steps (j1)–(j7) using correlation and search windows of progressively larger sizes.

46. A method according to claim 44, further comprising repeating steps (j1)–(j7) using a different traverse of said first and second pixel arrays.

47. A method according to claim 35, further including the step of (e) determining parallax for sub-pixels of said image by interpolating the parallax values derived in step (d).

48. A method according to 47, wherein step (e) comprises determining a correlation value for an integral pixel step at a maximum value of parallax and at two points on either side of the maximum, and processing the correlation values to interpolate the position between integral pixel steps at which the local maxima occurs.

49. A method according to claim 35, further including the step of (e) determining elevations of locations on said contoured surface in accordance with the parallax determined in step (d).

50. A method of determining parallax between different digitized first and second images of a surface, comprising the steps of:
- (a) correlating an initial pattern window including a first tie-point pixel of the first image with an initial correlation window in the second image by different placements of said initial correlation window in an initial search window including a second tie-point pixel of the second image to determine an initial placement, and determining a tie-point parallax between the first tie-point and the initial placement of the initial correlation window in the initial search window;

(b) correlating a subsequent pattern window including subsequent pixels of the first image with a subsequent correlation window in the second image by different placements of the subsequent correlation window in a subsequent search window of the second image to determine a subsequent placement responsive to one of the tie-point parallax and a subsequent parallax, and determining the subsequent parallax between one of the subsequent pixels of the first image and the subsequent placement of the subsequent correlation window in the subsequent search window; and (c) determining the parallax between pixels of the first and second images of the surface using one of the tie-point and the subsequent parallax.

51. A method according to claim 50, further comprising, before said step (a), the step of dividing the first image into boundary windows, and wherein said correlating steps (a) and (b) are performed for each of the boundary windows of the first image.

52. A method according to claim 50, wherein the subsequent search window is a size smaller than the initial search window.

53. A method according to claim 50, wherein the subsequent correlation window is a size smaller than the initial correlation window.

54. An apparatus for determining parallax between different digitized first and second images of a surface, comprising:

(a) first means for correlating an initial pattern window including a first tie-point pixel of the first image with an initial correlation window in the second image by different placements of the initial correlation window in an initial search window including a second tie-point pixel of the second image to determine an initial placement, and determining a tie-point parallax between the first tie-point and the initial placement of said initial correlation window in the initial search window;

(b) second means for correlating a subsequent pattern window including subsequent pixels of the first image with a subsequent correlation window in the second image by different placements of the subsequent correlation window in a subsequent search window of the second image to determine a subsequent placement responsive to one of the tie-point parallax and a subsequent parallax, and determining the subsequent parallax between one of the subsequent pixels of the first image and the subsequent placement of the subsequent correlation window in the subsequent search window; and (c) third means for determining the parallax between pixels of the first and second images of the surface using one of the tie-point and the subsequent parallax.

55. An apparatus according to claim 54, further comprising fourth means for dividing the first image into boundary windows, and wherein said first and second means perform the correlations for each of the boundary windows of the first image.

56. An apparatus according to claim 54, wherein the subsequent search window is a size smaller than the initial search window.

57. An apparatus according to claim 54, wherein the subsequent correlation window is a size smaller than the initial correlation window.

* * * * *